(12) United States Patent
Wood et al.

(10) Patent No.: US 6,180,166 B1
(45) Date of Patent: Jan. 30, 2001

(54) DOUBLE-SIDED ADHESIVE MATERIAL AND METHOD OF MAKING

(76) Inventors: Benny R. Wood, 187 Tates Estates Rd., Rome, GA (US) 30161-9107; Howard Burchett, Jr., 387 Sunset Dr. SE., Calhoun, GA (US) 30701

( * ) Notice: Under 35 U.S.C. 154(b), the term of this patent shall be extended for 0 days.

(21) Appl. No.: 09/540,852

(22) Filed: Mar. 31, 2000

Related U.S. Application Data

(62) Division of application No. 09/119,985, filed on Jul. 21, 1998.

(51) Int. Cl.[7] ........................................... B05D 3/12
(52) U.S. Cl. ................ 427/177; 427/208; 427/208.6; 427/208.8; 427/264; 427/277; 427/288; 427/289; 427/358; 427/392; 427/396
(58) Field of Search .................................. 427/177, 208, 427/208.6, 208.8, 264, 277, 288, 289, 358, 392, 396

(56) References Cited

U.S. PATENT DOCUMENTS

| | | |
|---|---|---|
| 4,702,948 | 10/1987 | Sieber-Gadient . |
| 4,732,800 | 3/1988 | Groshens . |
| 5,130,185 | 7/1992 | Ness . |
| 5,597,618 | 1/1997 | Bayer, Jr. et al. . |
| 5,958,802 | 9/1999 | Wilson . |

OTHER PUBLICATIONS

Tek Stil Concepts, Inc., Trends in ESD Flooring With Particular Emphasis on Retrofitting Old Floors, Jun. 8, 1996.
Sigaway, Dry–installation method, "Installation Instructions–Tips & Tricks".
"Welcome to SIGA" (no date avail.).
Sigaway, "The Efficient Way to Replace Old Glue–down Carpets, VAT, and Resilient Floor Coverings" (no date avail.).
SIGA–Contact, "The Professional System for Installing Carpet Cove Base" (no date avail.).

*Primary Examiner*—Bernard Pianalto
(74) *Attorney, Agent, or Firm*—Nikolai, Mersereau & Dietz, P.A.

(57) ABSTRACT

A method of manufacture for an adhesive-based system to removably stick relatively flat articles on large area surfaces. A cured pressure-sensitive adhesive is coated on both sides of a central flat, flexible support scrim in a zoned thickness pattern which includes sufficient, continuous thickness such that the system is well suited to the removable installation of many types of articles having rough surface textures including, but not limited to, floor coverings such as woven and double-backed carpets having backs of a relatively rough texture and unitary backed carpet having a rough latex or polymeric coating and no applied secondary scrim. The adhesive is cured in situ but remains pressure sensitive.

19 Claims, 3 Drawing Sheets

DOUBLE-SIDED ADHESIVE MATERIAL AND METHOD OF MAKING

This application is a Divisional application of application Ser. No. 09/119,985, filed Jul. 21, 1998.

BACKGROUND OF THE INVENTION

I. Field of the Invention

The present invention relates generally to the field of adhesive technology. More particularly, the invention involves an adhesive-based system to removably stick relatively flat articles on surfaces. The adhesive system includes a pressure-sensitive adhesive coated on both sides a central flat, flexible support scrim. The system is well suited to the removable installation of many types of articles having rough surface texture such as floor coverings, including, but not limited to, woven carpets having a natural fiber back such as cotton or jute or tufted carpets manufactured with synthetic primary and secondary back, which mimic natural fiber backs in texture, such as ActionBac (Trademark of Amoco Fabrics and Fibers). The invention also pertains to a method of making such a double-sided adhesive floor covering installation product which provides uniform continuous patterned adhesive surface on the scrim to accomplish high-shear adhesion with all types of broadloom carpets or others having backs of a relatively rough texture.

II. Related Art

The technique of employing double-sided or two-sided tapes is well known to the floor covering art. Such products have traditionally been applied at the joints or seams to secure mating sections together and to the under floor or substrate to obliterate visible seams. More recently, relatively wide double-sided adhesive tape-like products have been used to install new carpeting over existing floor coverings. One such product known as Sigaway®, available from SIGA-AG of Schachen, Switzerland, enables the removable installation of vinyl floor coverings over a variety of substrates and the installation of new carpet over existing carpet. The material is characterized as a tape and uses a pre-dried, pressure-sensitive contact adhesive film. That adhesive application tape is preferably used to cover the entire area of the installation. One drawback, however, resides in the fact that the product has a low tolerance to moisture penetration (approximately 3.5 lbs./1,000 sq. ft.) and is generally suitable to adhere only relatively smooth surfaced materials to substrates such as foam-back carpets, vinyls or other relatively smooth-backed products.

It is also generally known to apply varying patterns of adhesive to both sides of a tape scrim substrate. Groshens (U.S. Pat. No. 4,732,800) depicts the application of a heat-fusible adhesive material to a surface using an engraved or embossed cylinder. Bayer, Jr. et al in U.S. Pat. No. 5,597,618 disclose the application of a pressure sensitive adhesive to a receiving surface such as a paper substrate in a manner in which the characteristic surface of the adhesive layer may be varied by varying the surface velocity of an application member relative to the velocity of the substrate. Sieber-Gadient (U.S. Pat. No. 4,702,948) discloses a two-sided, woven, self-adhesive tape in which each side may be provided with a different adhesion capability. This may be achieved, for example, by an unevenness in the weave of the support layer or scrim caused by the crossing warp and weft threads that leads to a discontinuous or partial adhesive coating on the lower side. A smoother, upper side is provided with a uniform layer of adhesive which, in turn, addresses the floor covering to be held in place. In this manner, the supporting fabric produces unevenness only on the bottom side to make the material more readily detachable from the floor than from the floor covering material adhered to the top side.

While the above techniques offer certain advancements with respect to the installation of floor coverings utilizing two-sided adhesive bearing tapes or similar materials, this success has largely been limited to relatively smooth-backed floor covering materials rather than improving the installation of floor coverings having relatively rough backs including woven, broadloom, doublebacked tufted or unitary back (tufted or woven) carpets. With respect to the woven carpets, weaving produces a very regular pattern of warp and woof yarns in which the warp yarn runs lengthwise and the woof yarn runs across the width of the carpet. This regular pattern generally constitutes the back of the carpet and while regular in pattern, it presents an irregular or rough textured surface due to the crossing of the threads. While the face yarns are typically made of synthetic yarns such as various nylons, polyesters, polyolefins, acrylics and rayon, the back yarns of woven carpets are usually natural fibers, generally cotton or jute. In manufacture, the face yarns are woven into the back yarns in such a manner that the interweaving causes an interlock which holds the entire structure together. The rough texture of the back remains in the finished carpets.

Although tufted carpets look similar to woven carpets, their construction is actually quite different. In tufted carpets, the face yarns are inserted into a ready-made backing where they are adhesively held in place, usually by a coating of latex adhesive. A second back, which may be woven jute, is normally applied as an overlayer giving the carpet the outward appearance of being woven. Of course, certain carpets may be made entirely of synthetic materials. For example, those produced by Amoco Fabrics and Fibers which feature a secondary back that looks just like jute, but is actually a synthetic material are sold under the trademark ActionBac.

Unitary backs are tufted or woven carpets having only one application of a very low filler content, latex or polymeric back coating, giving them a very rough textured backing with deep recesses. No secondary fabric is applied as in ActionBac, or other such carpets used widely in heavy traffic commercial installations.

All these carpet types share backing materials which are uneven in surface texture and, therefore, difficult to uniformly address with a layer of adhesive material, particularly when that material is found as a layer applied to a flexible support carrying glue-down adhesive material. Accordingly, there remains a definite need in the art to provide a two-sided adhesive carpet laying material that adequately accommodates the rough surfaces associated with typical carpet backs and which, at the same time, enables the installed carpet to be removed and replaced without the need for scraping or solvents with respect to the floor.

Accordingly, it is a primary object of the present invention to provide a two-sided floor covering adhesive system that successfully retains many types of carpet materials including those of a class having uneven or rough backing texture.

A further object of the present invention is to provide a two-sided floor covering adhesive system that is pressure-sensitive and is further characterized by highshear strength, yet can be peeled off most surfaces unaided (without scraping).

Another object of the present invention is to provide a two-sided floor covering adhesive system that can be applied in a variety of widths and patterns to accommodate carpet rolls of varying widths and a variety of room sizes with or without seams.

A still further object of the present invention is to provide a two-sided floor covering adhesive system that provides an amount of adhesive on both sides of a flexible support scrim in troweled patterns.

A yet still further object of the present invention is to provide a two-sided floor covering adhesive system that is permeable to water vapor and so has relatively low sensitivity to floor moisture seepage.

Yet another object of the present invention is to provide a two-sided floor covering adhesive system that permits immediate occupancy upon floor covering installation.

Still another object of the present invention is to provide a two-sided floor covering adhesive system that contains no organic solvents (VoCs), is odor free and which can be utilized indoors in a commercial setting even on a work day.

Yet still another object of the present invention is to provide a method of making a two-sided floor covering adhesive system that includes application of a pressure-sensitive adhesive material to both sides of a flexible support scrim and curing the adhesive in situ on the scrim.

An additional object of the present invention is to provide a method of making a two-sided pressure-sensitive floor covering adhesive system that includes the application of the adhesive material on both sides of a flexible support scrim in desired troweled patterns.

Other objects and advantages will become apparent to those skilled in the art as they become familiar with the specification, drawings and claims herein.

SUMMARY OF THE INVENTION

The present invention solves many of the problems associated with the laying of floor coverings, particularly carpets including broad-loom, woven, double-backed tufted or unitary backed carpets using a two-sided, scrim-based floor covering adhesive system. The present invention provides a two-sided, scrim-based floor covering adhesive system that carries pre-cured, pressure-sensitive adhesive material in a troweled pattern of parallel thick and thin zones or bands of a suitable depth to accommodate the woven back or simulated woven back of any carpet. The scrim can be of any desirable readily processed width and combinations of width sizes can be used to glue down the entire surface of any size room whether multi-seamed or seamless. Typical scrim or support material widths may be from one to six feet.

As used herein, the terms "double-sided" or two-sided" are defined as and refer to a system in which adhesive material is applied to both sides of a flexible central support layer or web. The adhesive material applied need not have the same pattern or thickness or even the same composition on both sides of the support. The terms "web", "scrim", "support", "core layer", etc., as used herein, mean any flat, flexible material suitable for carrying the adhesive material on both sides in accordance with the invention.

The two-sided floor covering adhesive system of the invention preferably uses a cured, pressure-sensitive adhesive material of high shear strength, but relatively low tensile relative to the substrate so that once fixed in place, the adhered floor covering will not readily displace laterally, but can be peeled off by vertical lift without the need for scraping or for removal solvents. Preferably, the adhesive material will also be one that has a very low percentage of volatile organic compounds (VOC's) or is water-based and entirely free of organic solvents.

In addition, both the preferred adhesive material and the flexible support layer should have a fairly high tolerance for (or permeability to) moisture seepage, particularly with respect to passing water vapor so as to be relatively unaffected by the moisture which seeps up from concrete floors in many installations. This allows installation over concrete under a broader set of conditions.

Certain preferred adhesive materials are illustrated and described in one or more of U.S. Pat. Nos. 5,445,293; 5,652,288; and 5,721,302, all of which are common of inventorship with the present invention and which illustrate a variety of suitable water-based low or VOC-free materials which are pressure sensitive when cured and exhibit high shear and low tensile adhesion characteristics. The entire contents of the above-referenced patents are deemed incorporated herein by reference. Typical examples of compatible adhesive materials readily adaptable to the product and process of the present invention include water-based formulas of polymer latex base materials such as acrylics, styrene-butadiene, carboxylated styrene-butadiene, nitriles, neoprenes, ethylene and vinyl acetates in aqueous latex dispersion combined with a hardener, typically a rosin acid ester and an amount of a thickening agent. Resin modifiers containing polyurethanes may be included. Many of these materials are highly permeable to water vapor.

The present invention also includes a method or process for coating and curing both sides of a flexible support scrim to provide a two-sided floor covering adhesive system in accordance with the invention which may have any desired continuous zoned thickness-varying, possibly "troweled" pattern on both sides of the scrim. In a continuous process, the support scrim is coated on one side in the desired continuous pattern then convection cured and provided with release paper as desired. Thereafter, a continuous pattern of adhesive is applied to the second side which is also convection cured and the coated, cured scrim is processed into rolls for use. One preferred method utilizes a reciprocating applicator bar having a series of spaced notches to provide an undulating troweled zone pattern on the surface of the scrim material. Of course, one side need not be patterned as such if desired. With the two-sided floor covering adhesion system of the present invention, a non-woven type scrim is preferred. The central web or support scrim may be a polyethylene film or other synthetic polymer material.

It is also contemplated that, while the two-sided, flexible scrim-based adhesion system of the present invention is illustrated and described with reference to the application of certain floor coverings, it is contemplated that other relatively flat articles including wood flooring and ceramic materials or other materials including certain wall coverings could be applied utilizing an adhesion system within the scope of the invention. Therefore, the described process for making and use are included by way of illustration rather than limitation with respect to any aspect of the invention.

BRIEF DESCRIPTION OF THE DRAWINGS

In the drawings, wherein like numerals are utilized to designate like parts throughout the same.

DETAILED DESCRIPTION

The present invention deals with an improved system for applying floor coverings to a substrate and a process for producing that system. The system is particularly well suited to the application of rough-textured carpet species to a variety of substrate surfaces including concrete and wood. The system preferably uses pressure sensitive adhesives that have a high resistance to lateral displacement (high shear strength) once applied, but which exhibit limited tensile strength and can be peeled away from the substrate rather readily and remain intact avoiding the need for scraping or solvent assisted removal. The preferred adhesives also allow the passage of seepage moisture. The receiving surfaces for the adhesives similarly may be those of any suitable flat, flexible central support medium or scrim material, but is preferably one which has bi-directional dimensional stability. Non-woven, synthetic support scrims are preferred. The coating adhesive may be applied in any desired pattern or thickness consistent with continuous applicator bar patterned application and convection oven curing. Thus, the present invention, while described primarily with reference to the laying of rough-backed carpets on a floor substrate, also may having broader applicability to other adhesion operations as well. With this in mind, a detailed embodiment will next be described.

Figure 1:
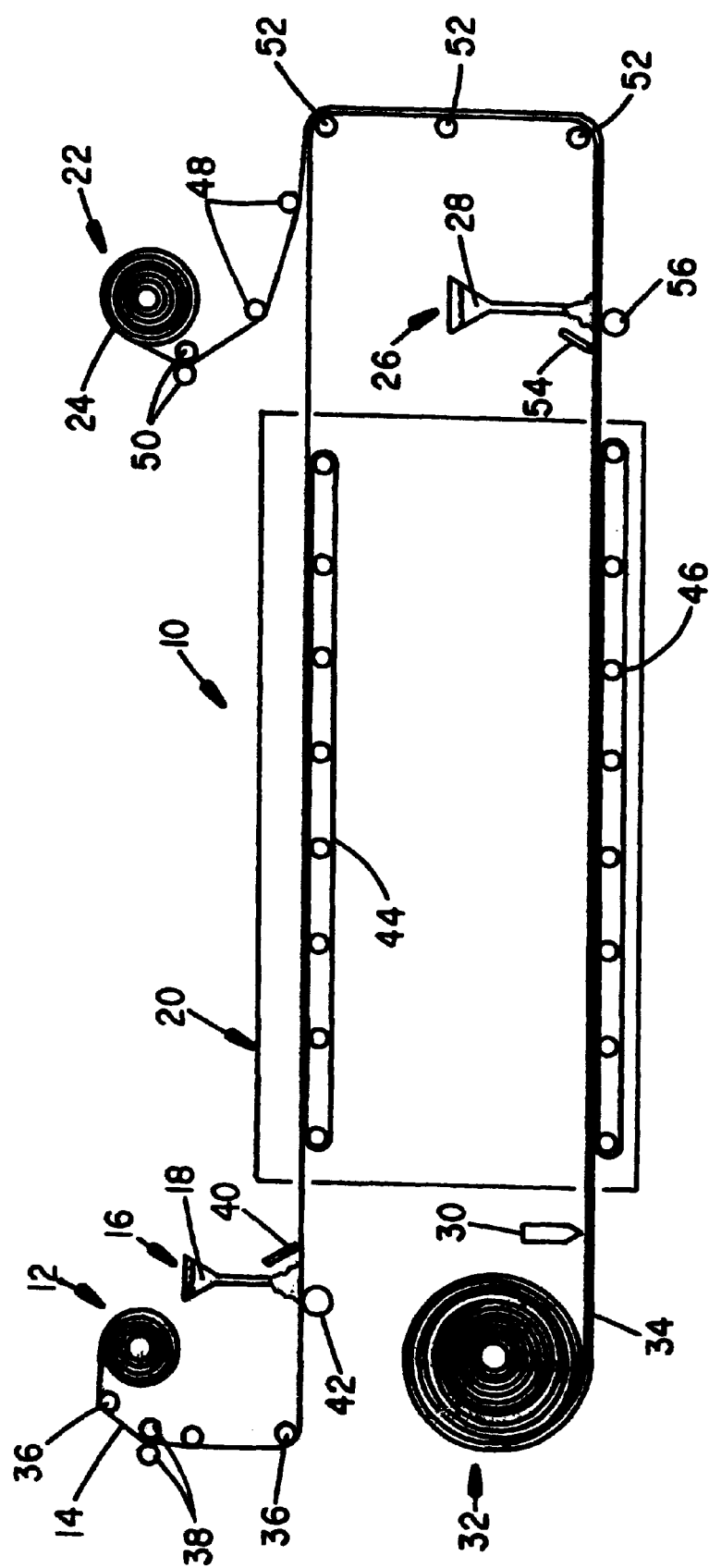
FIG. 1 is a schematic view of a system for producing the two-sided floor covering adhesive system of the invention.

FIG. 1 depicts a schematic view of a continuous processing line for practicing a preferred process of manufacture for the two-sided floor covering adhesive system of the invention. The processing line, generally at 10, includes a source 12 of a continuous feed of flat, flexible support or scrim material 14, which may be a continuous web of polyethylene or other such material, a first source 16 of adhesive material 18, a continuously conveyor fed curing convection oven 20, a source 22 for a coordinated continuous feed of flat, flexible release material 24, second source 26 of adhesive 28 which may be the same or a different adhesive material from the adhesive material 18. An array of spaced slitter or cutting devices, one of which is depicted at 30, are provided to cut or divide the fully cured material 34 to the proper widths before being stored on product rolls as at 32.

The input support scrim encounters a number of guide rollers as at 36 and proceeds between a set of tension rollers 38 and thereafter encounters a first adhesive applicator or doctor bar 40 which operates against a bed plate 42 to spread and control the load of adhesive material 18 in the desired pattern on the scrim layer 14. Driven upper and lower conveyor belts 44 and 46 are provided to convey the material in consecutive passes through the double-pass continuous convection oven 20. The release material or release paper supply system further includes a series of guide rollers 48 and a pair of tension rolls 50. Additional guide rollers provide support for the scrim as coated on one side are shown at 52 and a second adhesive application station, including a second applicator or doctor bar 54 and associated bed plate 56, is provided to apply adhesive to the second side of the support layer.

Figure 2A:
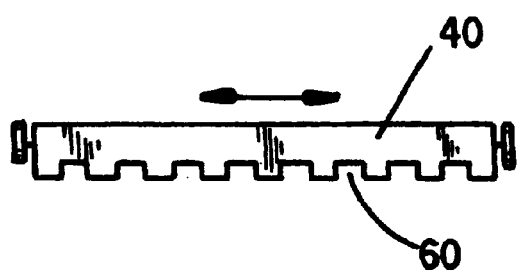
FIG. 2a is a view of an adhesive applicator bar.

As seen in FIG. 2a, the applicator bar 40 is provided with a patterned series of serrations, notches or other recesses 60. The bar 40 may be identical in design to the bar 54 or it may incorporate a substantially different size or pattern of recesses depending on the desired differences in the configuration of the adhesive coating layer from side to side of the scrim. Each of the applicator bars 40, 54 may be designed to reciprocate or oscillate at a controlled, possibly variable rate, in a direction at an angle to, and usually, perpendicular or lateral to the travel vector of the support scrim as indicated at 62. This may be accomplished mechanically in any of a number of ways, such as by using an eccentric cam and follower system. Such methods and systems are well known in the mechanical arts and need not be further described here. The reciprocal action of the applicator bars can be used to apply a wavy pattern as at 70 in FIG. 2b. The oscillating action may be used in association with one or both bars or not used, as desired, depending on the requirements of the particular adhesive system being processed. In this manner, the applicator bar can impart a wavy or straight pattern to one or both sides of the scrim.

In operation, the scrim material 14, which may be up to about six feet in width, is fed from the roll at 12 through the pinch or tension rolls 38 which control the tension of the feed to the first adhesive coat application station where a layer of tacky, viscous adhesive material 18 is applied continuously to one side of the support scrim in conjunction with the spreader bar 40 which enables the application of a uniform pattern of adhesive which may be straight or wavy and of any desired thickness or pattern in accordance with the particular bar used. The scrim, now containing a continuous patterned coat of adhesive on one side, proceeds into the convection oven 20 where forced convection air and heat are applied to cure (possibly by crosslinking) and dry the adhesive. The temperature of the oven, amount of convection applied and speed of the line, of course may be varied depending upon the particular nature and composition of the adhesive being cured or processed. The cured adhesive, while dry, remains pressure-sensitive, and as such, requires separation by release paper or plastic release material 24 which is applied from the supply 22 by the applicator roll 48.

The support material having adhesive on one side masked by a layer of release material proceeds to the second adhesive station where the same or a different adhesive material is applied to the other side of the support scrim by the second applicator bar 54 operating against a bed plate 56. At this point, the scrim again enters the convection oven 20 for a second pass where the second layer of adhesive is cured in like manner to the first. After this curing step, the processed material may be cut to the desired width by a series of spaced adjustable cutters or slitter blades 30 prior to being processed into packaged rolls as at 32 for packaging and shipment. While any readily usable width can be processed, it has been found that if the material is provided in widths of 1, 2 or 3 feet, almost any size room or carpet width can be readily accommodated in a manner where the carpet seams do not coincide with the seams of the adhesive system which, of course, is preferable for installation.

Any suitable flat, flexible support layer or scrim material which remains substantially dimensionally stable after processing may be utilized in the system of the present invention. Non-woven, synthetic materials are preferred, such as polyolefins including polyethylene and polypropylene. Furthermore, the material may be of any convenient thickness which also may vary somewhat with application. The material of the support or scrim layer like the adhesive material preferably is pervious to and readily passes water vapor. The normal range of thicknesses used, of course, depends on the composition of the support membrane itself, but typically is from about 0.002 in. to about 0.006 in. (2–6 mils).

With respect to the adhesive material, any material which remains pressure-sensitive upon curing and which exhibits relatively high shear and relatively low tensile properties such that it will retain the floor covering in place laterally once applied, but can be peeled off or removed vertically without the need for additional solvents or scraping is preferred. In addition, water-based materials free of organic solvents which instantly adhere with pressure and present no environmental hazard during installation and use are also preferred, as are materials which readily pass moisture and are thus substantially unaffected by concrete floor seepage problems or the like. As indicated above, such materials as aqueous latex dispersions of polymer latex-base materials with or without polyether or polyester-polyurethane synthetic resin as disclosed in the above-mentioned patents to Wood et al have been found to be especially compatible with the present floor covering adhesion system. The adhesive materials also must be free flowing prior to cure sufficiently to be easily applied using the spreader bars to coat the adhesive on the scrim material during processing. The material also must be susceptible of rapid curing in a convection oven. The convection ovens as at 20 typically can be operated in the range of temperatures from about 80° C. to about 150° C. and the typical residence time of the scrim in the oven for each pass depends on the curing characteristic of the adhesive composition is about 10±3 minutes. Generally, if one side is to be coated with an adhesive layer relatively thicker than that applied to the other, the thicker coat or layer should be applied to the first side processed so that it may take advantage of being subjected to both passes through the curing convection oven 20 giving it additional cure time.

Figure 2B:
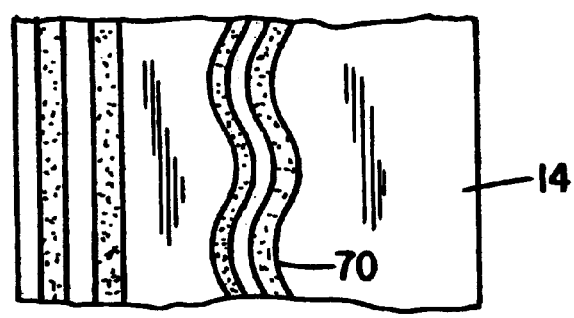
FIG. 2b is a schematic top view of the scrim depicting several partial adhesive patterns.
Figure 2C:
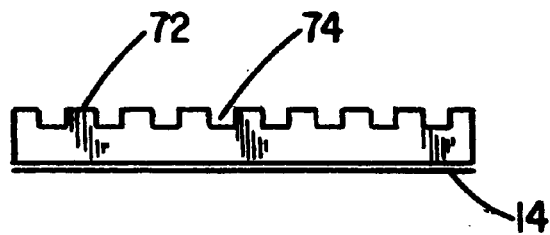
FIG. 2c is an end view of the scrim showing a straight adhesive pattern.

The pattern and thickness of the adhesive coatings flanking the support scrim may be varied by varying the pattern, clearance and operation of each application bar 40, 54. A regular rectangular notch cut out "trowel" pattern may be employed which has evenly spaced rectangular recess notches in the edge of the applicator bar of the desired depth as shown at 60 in FIG. 2a. If the applicator is not reciprocated or oscillated during adhesive application, a pattern of straight parallel alternate heavy (thick) and light (thin) strip shaped zones or bands, respectively at 72 and 74, within the continuous patterned layer is applied to the scrim as shown in FIGS. 2b and 2c. The zones or bands may be any desired width and are typically 0.1 inches or greater in width.

Reciprocal operation of the applicator as a layer of controlled thickness is applied produces the wavy pattern 70. The continuous alternate relatively heavy zones or bands of adhesive are preferably of a thickness sufficient to penetrate and produce a good continuous adhesive bond despite the rough texture of woven and double-back carpets to assure a uniform high-shear installation. The substrate facing lower side may be provided with the same or a different pattern of adhesive.

In this manner, a variety of applicator blades and operating speeds may be used interchangeably to produce a variety of adhesive patterns on flat, flexible support scrims suitable for a great many floor coverings or other material for surface adhesion. Typically, for carpets, the heavy or thick portions of the continuous layer may be from about 0.1 to about 0.3 inches in thickness and the relatively thin strips or rows therebetween may be from about 0.02 to about 0.1 inches. Pattern widths vary typically from about 0.1 to about 0.03 inches, but can be any desired size. The composition of the adhesive should also be considered. One successful pattern had thin zones ≅0.03 inches thick and thick zones ≅0.16 inches.

Figure 2D:
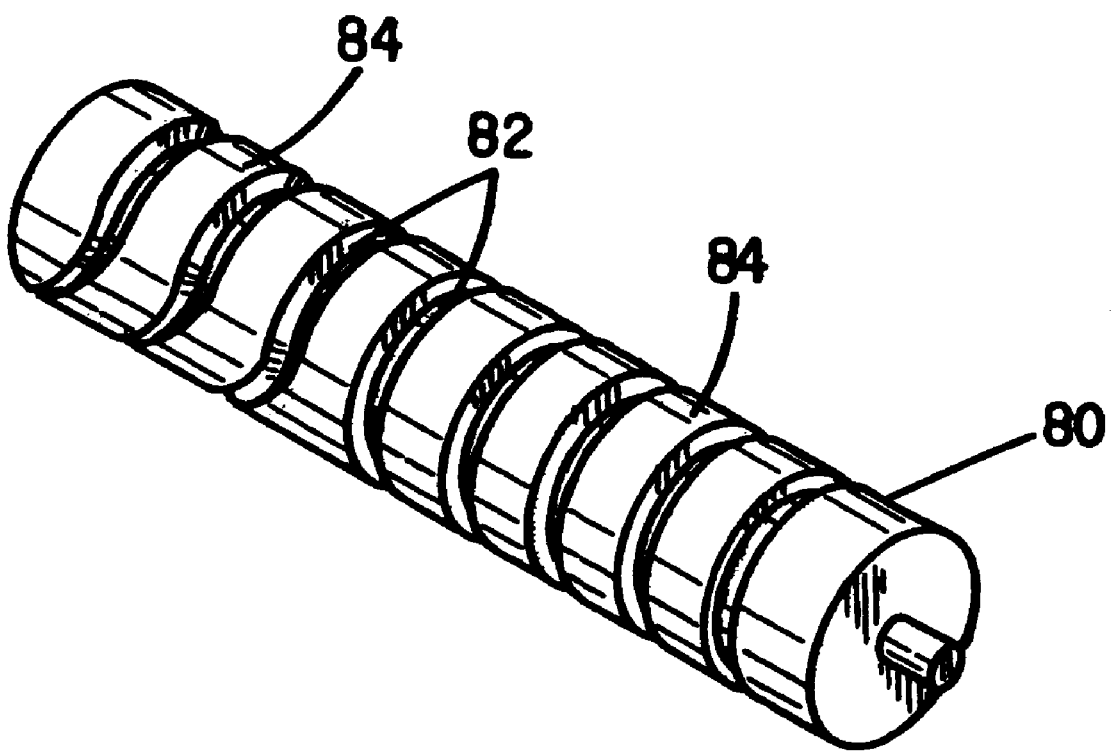
FIG. 2d depicts an alternative embodiment which grooved applicator rollers replace the applicator bars.

An alternative arrangement utilizes a pattern on applicator rollers as at 80 in FIG. 2d. The applicator rollers replace the applicator or doctor bars 40, 54 to pattern the adhesive on the scrim. The indented or recessed portions 82 and raised portions 84 may be of any desired width and they may be straight or meandered as desired.

The adhesive system is generally applied to completely cover a clean substrate to be carpeted, such as wood, concrete, existing vinyl floor covering, or the like, in accordance with a pattern devised to accommodate the carpet roll width and room size in coordination with application of the carpet. The carpeted room is then rolled using a standard carpet roller, or the like, to accomplish uniform adhesion.

The patterned adhesive coating can be made to provide essentially uniform and generally full contact adhesion for even the roughest carpet back textures. This allows rapid and high-shear installation of carpets unavailable with previous two-sided system. By selecting the proper moisture (water vapor) permeable support layer and adhesive, installation over even high-seepage porous substrate has been quite successful.

This invention has been described herein in considerable detail in order to comply with the Patent Statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. A continuous process for producing an adhesive system which includes a flat, flexible central support scrim, having top and bottom sides, sandwiched between top and bottom adhesive coats including the steps of:
   (a) applying a continuous layer of adhesive material to said top side of said support scrim and passing said support scrim beneath a first applicator bar of patterned edge to modify said continuous layer to produce a top coating characterized by a zone-patterned outer surface having variations in the thickness of adhesive in a continuous regular pattern;
   (b) subjecting the adhesive material of said top coating to a curing step;
   (c) applying a release material to said top coating;
   (d) applying a continuous layer of adhesive material to said bottom side of said support scrim and passing said support scrim beneath a second applicator bar to produce a desired bottom coating;
   (e) subjecting the adhesive material of said bottom coating to a curing step; and
   (f) processing said adhesive system into rolls for storage.

2. The process of claim 1 wherein each of said curing steps further includes conveying said coated support scrim through a continuous convection oven.

3. The process of claim 1 wherein thicker areas of the pattern of said top coating are thicker than any portion of said bottom coating.

4. The process of claim 3 wherein the adhesive material is a high shear strength, water-based, organic solvent-free material that remains pressure sensitive when cured.

5. The process of claim 4 further comprising the step of causing at least one of said applicator bars to reciprocate relative to said scrim during application of said adhesive material to produce a non-linear pattern.

6. The process of claim 4 wherein at least one of said applicator bars is replaced by a grooved applicator roller.

7. The process of claim 1 wherein at least one of said applicator bars is replaced by a grooved applicator roller.

8. The process of claim 1 wherein said second applicator bar has a straight edge.

9. The process of claim 1 wherein the adhesive material is a high shear strength, water-based, organic solvent-free material that remains pressure sensitive when cured.

10. The process of claim 9 wherein said convection oven is heated in the range from about 80° C. to 150° C.

11. The process of claim 1 including the step of slitting said cured adhesive system into desired widths prior to processing the material into rolls.

12. The process of claim 1 further comprising the step of causing at least one of said applicator bars to reciprocate relative to said scrim during application of said adhesive material to produce a non-linear pattern.

13. The process of claim 12 wherein both of said applicator bars are caused to reciprocate during application of said adhesive material.

14. A continuous process for producing an adhesive system which includes a flat, flexible central support scrim, having top and bottom sides, sandwiched between top and bottom adhesive coats including the steps of:

(a) applying a continuous layer of adhesive material to said top side of said support scrim and passing said support scrim beneath a first applicator bar of patterned edge to modify said continuous layer to produce a top coating characterized by a patterned outer surface and having adhesive thickness variations arranged in a continuous regular pattern;

(b) subjecting the scrim carrying said adhesive material of said top coating to a curing step;

(c) applying a release material to said top coating;

(d) applying a continuous layer of adhesive material to said bottom side of said support scrim and passing said support scrim beneath a second applicator bar of patterned edge to modify said continuous layer to produce a desired bottom coating characterized by a patterned outer surface and having adhesive thickness variations arranged in a continuous regular pattern;

(e) subjecting the adhesive material of said bottom coating to a curing step;

(f) processing said adhesive system into rolls for storage; and (g) wherein each curing step further includes conveying said coated support scrim through a continuous convection oven.

15. The process of claim 14 wherein thicker areas of the pattern of said top coating exceed those of said bottom coating in thickness and are twice exposed in said convection oven.

16. The process of claim 14 including the step of slitting said cured adhesive system into desired widths prior to processing the material into rolls.

17. The process of claim 14 wherein the adhesive material is a high shear strength, water-based, organic solvent-free material that remains pressure sensitive when cured.

18. The process of claim 17 wherein said convection oven is heated in the range from about 80° C. to 150° C.

19. The process of claim 14 wherein said support scrim is a non-woven synthetic material having a thickness in the range of 0.002 to 0.006 inch (0.005 to 0.015 cm).

* * * * *